(12) United States Patent
Kautzsch

(10) Patent No.: US 9,551,837 B2
(45) Date of Patent: Jan. 24, 2017

(54) SILICON OPTICAL LINE MULTIPLEXER DEVICES

(75) Inventor: Thoralf Kautzsch, Dresden (DE)

(73) Assignee: Infineon Technologies AG, Neubiberg (DE)

( * ) Notice: Subject to any disclaimer, the term of this patent is extended or adjusted under 35 U.S.C. 154(b) by 968 days.

(21) Appl. No.: 13/286,563

(22) Filed: Nov. 1, 2011

(65) Prior Publication Data

US 2013/0108214 A1 May 2, 2013

(51) Int. Cl.
*G02B 6/35* (2006.01)
*H04J 14/02* (2006.01)

(52) U.S. Cl.
CPC ............ *G02B 6/3522* (2013.01); *G02B 6/357* (2013.01); *G02B 6/3546* (2013.01); *H04J 14/0212* (2013.01)

(58) Field of Classification Search
None
See application file for complete search history.

(56) References Cited

U.S. PATENT DOCUMENTS

| 4,674,828 | A | * | 6/1987 | Takahashi | G02B 6/12004 385/17 |
| 5,444,801 | A | * | 8/1995 | Laughlin | G02B 6/352 385/16 |
| 5,841,917 | A | * | 11/1998 | Jungerman | G02B 6/3514 385/15 |
| 5,998,906 | A | * | 12/1999 | Jerman et al. | 310/309 |
| 6,388,359 | B1 | | 5/2002 | Duelli | |
| 6,400,855 | B1 | * | 6/2002 | Li et al. | 385/4 |
| 6,424,759 | B1 | * | 7/2002 | Jing | G02B 6/3514 385/17 |
| 6,445,841 | B1 | * | 9/2002 | Gloeckner | G02B 6/3514 385/17 |
| 6,587,481 | B1 | * | 7/2003 | Seong et al. | 372/9 |
| 6,591,037 | B2 | | 7/2003 | Yonekubo | |
| 6,658,177 | B1 | * | 12/2003 | Chertkow | 385/18 |
| 6,816,295 | B2 | | 11/2004 | Lee | |
| 6,839,479 | B2 | | 1/2005 | Berger | |
| 7,054,519 | B1 | | 5/2006 | Novotny | |
| 7,127,136 | B2 | * | 10/2006 | Hall | 385/16 |
| 7,561,760 | B2 | * | 7/2009 | Pesetski et al. | 385/4 |
| 8,611,705 | B2 | | 12/2013 | Kautzsch | |
| 8,957,490 | B2 | * | 2/2015 | Kautzsch | 257/436 |
| 2002/0001431 | A1 | * | 1/2002 | Yonekubo | 385/32 |
| 2002/0031294 | A1 | * | 3/2002 | Takeda et al. | 385/16 |
| 2010/0054655 | A1 | * | 3/2010 | Glebov et al. | 385/9 |

(Continued)

OTHER PUBLICATIONS

Wu et al., "Optical MEMS for Lightwave Communication", Journal of Lightwave Technology, vol. 24, No. 12, Dec. 2006, pp. 4433-4454.

(Continued)

*Primary Examiner* — Tina Wong
(74) *Attorney, Agent, or Firm* — Schiff Hardin LLP

(57) ABSTRACT

Embodiments relate to silicon optical line multiplexers. In an embodiment, an optical line multiplexer includes at least one microprism etched from a silicon substrate. Another embodiment includes a plurality of these microprisms forming an array. In use, a light beam is guided through the multiplexer device such that it impinges on a line of microprisms that, depending upon their orientation, either reflect/deflect or transmit the beam.

24 Claims, 2 Drawing Sheets

(56) References Cited

U.S. PATENT DOCUMENTS

| 2011/0068420 A1 | 3/2011 | Binder |
| 2015/0001665 A1 | 1/2015 | Kautzsch |
| 2015/0021734 A1* | 1/2015 | Kautzsch ..................... 257/506 |
| 2015/0079787 A1* | 3/2015 | Kautzsch et al. ............ 438/689 |

OTHER PUBLICATIONS

Johnsen et al., "A Simple Demonstration of Frustrated Total Internal Reflection", Am. J. Phys., vol. 76, No. 8, Mar. 10, 2008, pp. 746-749.
Rauschenbeutel, "Glasfasern dünner als Licht", Jan. 2009, pp. 19-21.
Figure from "Practical MEMS: Design of microsystems, accelerometers, gyroscopes, RF MEMS, optical MEMS and micro-fluidic systems", by Ville Kaajakari, ISBN-10: 0982299109 | ISBN-13: 978-0982299104 | Publication Date: Mar. 17, 2009.
Wu et al., *Optical MEMS for Lightwave Communication,* Journal of Lightwave Technology, vol. 24, No. 12, Dec. 2006, pp. 4433-4454.
Johnsen et al., *A Simple Demonstration of Frustrated Total Internal Reflection,* Am. J. Phys., vol. 76, No. 8, Mar. 10, 2008, pp. 746-749.
Rauschenbeutel, *Glasfasern dünner als Licht,* Dated Jan. 2009, pp. 19-21.
Application and Filing Receipt for U.S. Appl. No. 14/031,694, filed Sep. 19, 2013 inventors Kautzsch, et al.
Application and Filing Receipt for U.S. Appl. No. 13/930,167, filed Jun. 28, 2013 inventor Kautzsch.
Application and Filing Receipt for U.S. Appl. No. 13/945,113, filed Jul. 18, 2013 inventor Kautzsch.

* cited by examiner

SILICON OPTICAL LINE MULTIPLEXER DEVICES

TECHNICAL FIELD

The invention relates generally to multiplexers and more particularly to silicon optical line multiplexers.

BACKGROUND

Optical networks rely on switches, modulators and data selectors in order to reliably distribute signals via extensive and ramified systems. Electrical switches, associated with conversion of the optical signal into an electrical signal and reconversion, require a not-inconsiderable amount of electronic hardware and are furthermore coupled with an appreciable power consumption. For switching optical data lines, micromechanical structures have been used for some time and enable signals to be distributed at a purely optical level. Modulation frequencies of about 1 Mb/s initially were achieved thereby, with these frequencies since increased through structural improvements.

Conventional optical modulators and multiplexers use an array of movable mirrors. Each individual mirror in such a conventional device reflects a light beam onto either an output channel or a dead channel, such as is depicted in FIG. 1. Disadvantages of such a device include production complexities, as technologies of this type typically require separate production processing that is remote from standard CMOS, and the practical impossibility for such systems to be manufactured jointly with a process for the control chip. Additionally, the housing and associated process are also cost-intensive in order to protect the micromirrors from external debris, such as moisture and dust.

Therefore, there is a need for improved optical switching devices.

SUMMARY

Embodiments relate to optical line multiplexers. In an embodiment, an optical switching device comprises a silicon substrate; and at least one optical switching element etched in the silicon substrate and comprising a silicon microprism structure configured to selectively reflect or transmit an optical beam.

In an embodiment, a method comprises inputting an optical signal to an optical switching device comprising a microprism formed in a silicon substrate; and selectively reflecting the optical signal by microprism the optical switching device.

In an embodiment, an integrated circuit comprises a silicon substrate; at least one optical switching element etched in the silicon substrate and comprising a silicon microprism structure configured to selectively reflect or transmit an optical beam; and an application-specific integrated circuit formed on the silicon substrate.

BRIEF DESCRIPTION OF THE DRAWINGS

The invention may be more completely understood in consideration of the following detailed description of various embodiments of the invention in connection with the accompanying drawings, in which.

Figure 1:
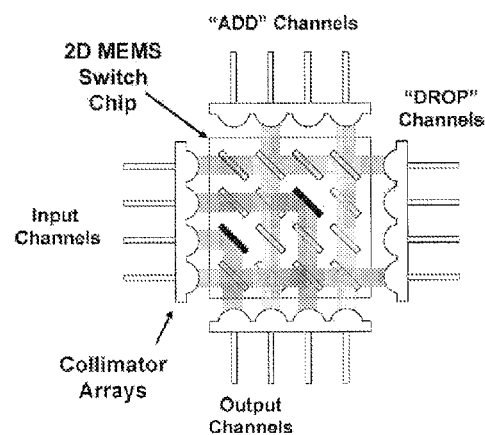
FIG. 1 is a diagram of a conventional MEMS optical switch.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to silicon optical line multiplexers. In an embodiment, an optical line multiplexer comprises at least one microprism etched from a silicon substrate. Another embodiment comprises a plurality of these microprisms forming an array. In use, a light beam is guided through the multiplexer device such that it impinges on a line of microprisms that, depending upon their orientation, either reflect/deflect or transmit the beam.

Figure 2:
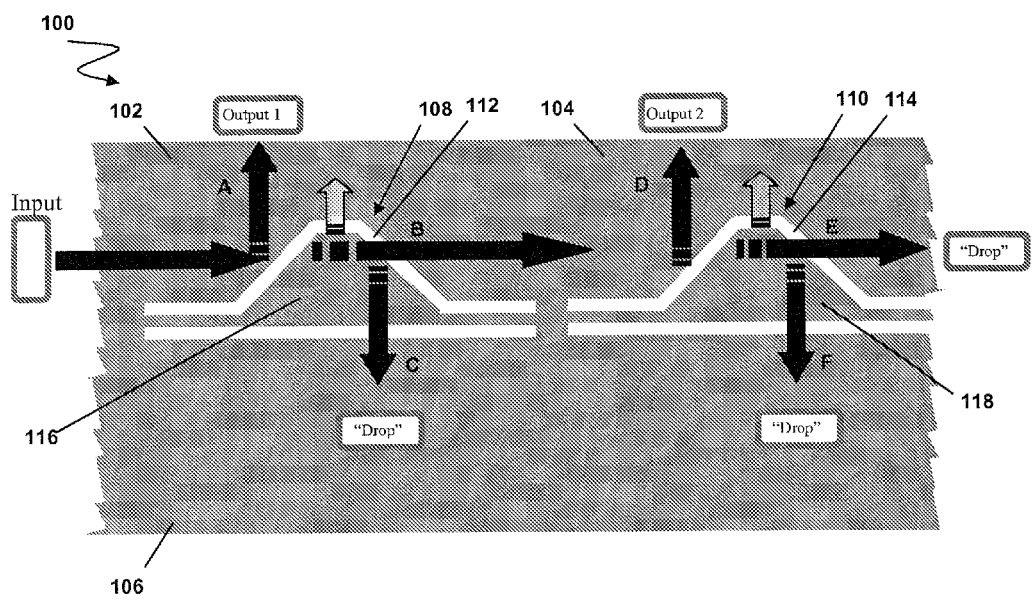
FIG. 2 is a diagram of an optical switching device according to an embodiment.
Figure 3:
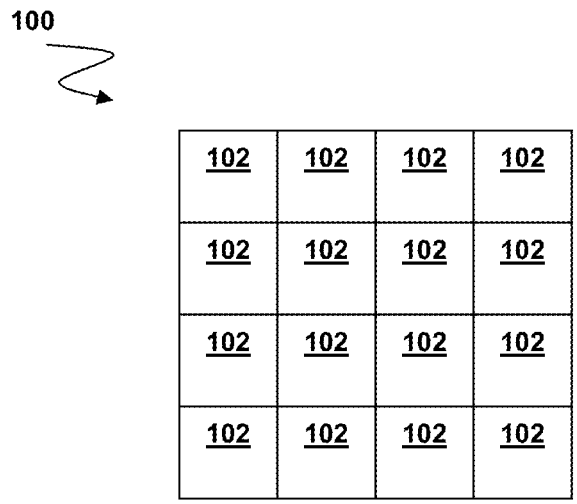
FIG. 3 is a block diagram of a matrix of optical switching devices according to an embodiment.

Referring to FIG. 2, an embodiment of an optical line device 100 is depicted. Device 100 can comprise an optical switch, an optical modulator, an optical multiplexer or some other device or combination of devices in embodiments. Only a portion, or two switching cells 102 and 104 arranged in a line, of device 100 is depicted in FIG. 2. In embodiments, device 100 can comprise N lines of N switching cells to form an N×N array or matrix of switching cells, such as the 4×4 array depicted in FIG. 3.

Device 100 comprises a silicon substrate 106 in which cells 102 and 104 are formed. In embodiments, a Venezia process for producing a cavity in a silicon substrate with a deep trench (DT) etching process can be used, though other suitable processes and methodologies can be used in other embodiments. The structure can be sealed with, for example, a polysilicon plate in an embodiment, with a CMOS process subsequently implemented in embodiments in which an application-specific integrated circuit (ASIC) is to be produced on the same chip.

Each cell 102, 104 comprises a silicon micromechanical structure 108, 110, such as a silicon prism. Structures 108 and 110 comprise a moveable or deformable prism portion 112, 114 configured to be moved, turned or otherwise manipulated in order to influence an incoming light beam. For example, structures 108, 110 can be manipulated such that an incoming signal strikes a particular surface of structure 108 or 110 when structures 108, 100 comprise prisms. In embodiments, structures 108, 110 are capacitively manipulated. In other embodiments, other methodologies can be used.

As structures 108, 110 are manipulated, the configuration of an adjacent vacuum or air gap 116, 118 also changes in embodiments. In an embodiment, a dimension of gap 116, 118 is approximately equal to a wavelength of the optical input.

Structures 108 and 110 can be configured in other ways in other embodiments, for example with a differently arranged or configured moveable portion 112, 114 or another configuration of gaps 116, 118. Further, the number and/or orientation of the outputs and the drops also can be altered in other embodiments, as can the particular configuration of each structure 108, 110 in order to reflect, transmit or drop. Moreover, cells 102 and 104 need not be identical in embodiments.

In operation, an optical input signal 120, such as infrared light, enters a cell 102. Structure 108 can be set to reflect signal 120 to output 1 (A), to transmit signal 120 through cell 102 (B), or to drop the signal (C). If signal 120 is transmitted through cell 102 such that signal 120 enters cell 104, structure 110 can be configured to reflect signal 120 to output 2 (D), to transmit signal 120 through cell 104 (E), which in this case results in a drop as there is no cell in the line following cell 104, or to drop signal 120 (F).

Figure 4:
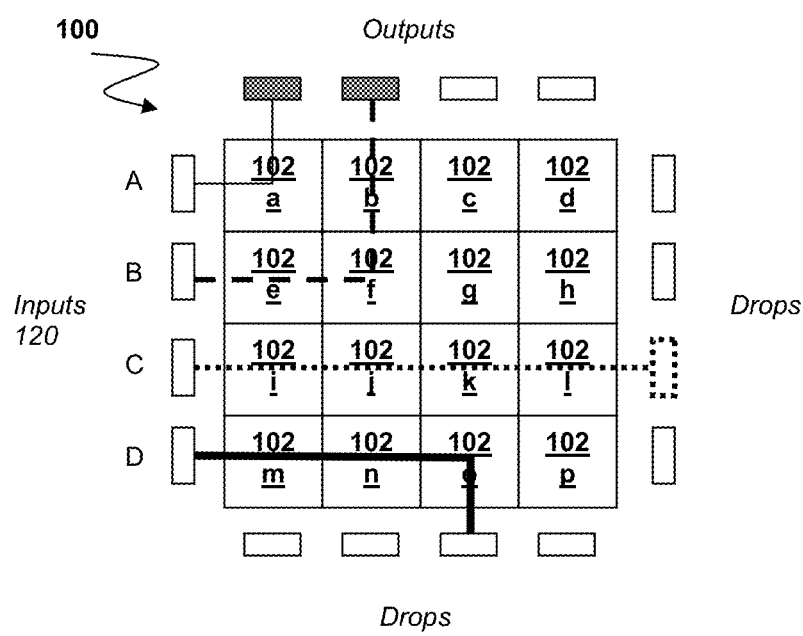
FIG. 4 is a block diagram of a matrix of optical switching devices according to an embodiment.

In this way an array or matrix of cells like 102 and 104 can be formed. An input can then be connected to a desired output of the array by switching the desired column of output to reflect only in the line of the input and all other switches to transmission. An example 4×4 matrix of cells 102a-p is depicted in FIG. 4. Input signals 120A-D enter device 100 and cells in their respective lines A-D. In line A, cell 102a is configured to reflect signal 120A to an output. In line B, cell 102e is set to transmit signal 120B while cell 102f, along with cell 102b, is set to drop the signal. In line C, cells 102i-1 drop signal 120C by transmitting it through, while in line D cells 102m and 102n transmit signal 120D and cell 102o drops the signal.

Embodiments relate to silicon optical switches and other devices, such as modulators and multiplexers. Embodiments can comprise or form a part of optical routers, mobile phones and other devices, and televisions, among others. Lines or arrays of individual switching cells can be formed in virtually any capacity and/or configuration, providing a multitude of switching options.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An optical switching device comprising:
   a monolithic silicon substrate; and
   at least one micromechanical optical switching element etched in the monolithic silicon substrate and comprising a silicon microprism structure configured to be manipulated to select between reflecting and transmitting an optical beam.

2. The optical switching device of claim 1, wherein the at least one micromechanical optical switching element comprises a plurality of micromechanical optical switching elements arranged in a line.

3. The optical switching device of claim 1, wherein the at least one micromechanical optical switching element comprises a plurality of micromechanical optical switching elements arranged in an N×N array.

4. The optical switching device of claim 1, further comprising an application-specific integrated circuit formed on the monolithic substrate.

5. The optical switching device of claim 1, wherein the silicon microprism structure is configured to be manipulated based at least in part on a capacitance.

6. The optical switching device of claim 1, further comprising an air gap adjacent the silicon structure.

7. The optical switching device of claim 6, wherein a volume of the air gap changes when the silicon microprism structure selectively reflects or transmits an optical beam.

8. The optical switching device of claim 6, wherein the air gap comprises a vacuum.

9. The optical switching device of claim 6, wherein a dimension of the air gap is approximately equal to a wavelength of the optical beam.

10. The optical switching device of claim 1, wherein the optical beam comprises an infrared beam.

11. The optical switching device of claim 1, wherein the device comprises a multiplexer.

12. The optical switching device of claim 1, wherein the device comprises a modulator.

13. A method comprising:
    inputting an optical signal to a micromechanical optical switching device comprising a microprism formed in a monolithic silicon substrate; and
    manipulating the microprism to select between reflecting and transmitting the optical signal by the microprism.

14. The method of claim 13, further comprising forming the micromechanical optical switching device by etching the microprism in the monolithic silicon substrate, the microprism configured to selectively reflect the optical signal.

15. The method of claim 14, wherein forming the micromechanical optical switching device further comprises utilizing a Venezia process to produce a cavity in the monolithic silicon substrate.

16. The method of claim 15, wherein forming the optical switching device optical switching device further comprises utilizing a deep trench etching process.

17. The method of claim 14, further comprising forming an application-specific integrated circuit on the monolithic silicon substrate.

18. The method of claim 13, wherein selectively reflecting the optical signal further comprises manipulating the micromechanical optical switching device based at least in part on a capacitance.

19. The method of claim 13, wherein inputting an optical signal comprises inputting an infrared signal.

20. An optical switching device comprising:
a silicon substrate; and
a plurality of micromechanical optical switching elements etched in the silicon substrate and arranged in a line, wherein each of the micromechanical optical switching elements comprises a silicon microprism structure configured to be manipulated to select between reflecting and transmitting an optical beam, and at least one of the plurality of micromechanical optical switching elements is configured to selectively transmit the optical beam to another of the plurality of micromechanical optical switching elements.

21. An integrated circuit comprising:
the optical switching device of claim 20; and
an application-specific integrated circuit formed on the silicon substrate.

22. The optical switching device of claim 20, wherein the at least one of the plurality of micromechanical optical switching elements is configured to selectively reflect the optical signal to an output, to transmit the optical beam to another of the plurality of micromechanical optical switching elements, or to drop the optical signal.

23. The integrated circuit of claim 21, wherein the integrated circuit is one of a switch, a modulator or a multiplexer.

24. The integrated circuit of claim 21, wherein the at least one micromechanical optical switching element comprises a plurality of micromechanical optical switching elements arranged in an N×N array.

* * * * *